Feb. 10, 1925.      S. T. SIEGEL      1,526,095
COMBINED CUPBOARD, TABLE, AND SEAT
Filed April 11, 1923

Inventor
Sophie T. Siegel,
By E. Sutton Brewington
Attorney

Patented Feb. 10, 1925.

1,526,095

UNITED STATES PATENT OFFICE.

SOPHIE T. SIEGEL, OF BALTIMORE, MARYLAND.

COMBINED CUPBOARD, TABLE, AND SEAT.

Application filed April 11, 1923. Serial No. 631,319.

*To all whom it may concern:*

Be it known that I, SOPHIE T. SIEGEL, a citizen of the United States, residing at Baltimore city, State of Maryland, have invented certain new and useful Improvements in Combined Cupboards, Tables, and Seats, of which the following is a specification.

This invention relates to a combined cupboard and table designed primarily for use by autoists, one of the objects of the invention being to provide a structure of this character that can be carried readily back of the front seat of an automobile where it can be used as a supplemental seat, the device being so constructed as to provide ample room for the feet of the occupants of the rear seat.

Another object is to provide a table structure the end supports or leg portions of which constitute housings for various articles to be used when dining.

A further object is to provide a table having hinged leaves carrying cushions for use when the structure is employed as a vehicle seat, said leaves being movable to inverted positions to constitute table extensions adapted to be supported by some of the doors of the device.

With the foregoing and other objects in view which will appear as the description proceeds the invention consists of certain novel details of construction and combinations of parts which will be hereinafter more fully described and pointed out in the claim, it being understood that changes may be made within the scope of the claim without departing from the spirit of the invention.

In the accompanying drawing the preferred form of the invention has been shown.

In said drawing—

Figure 1:
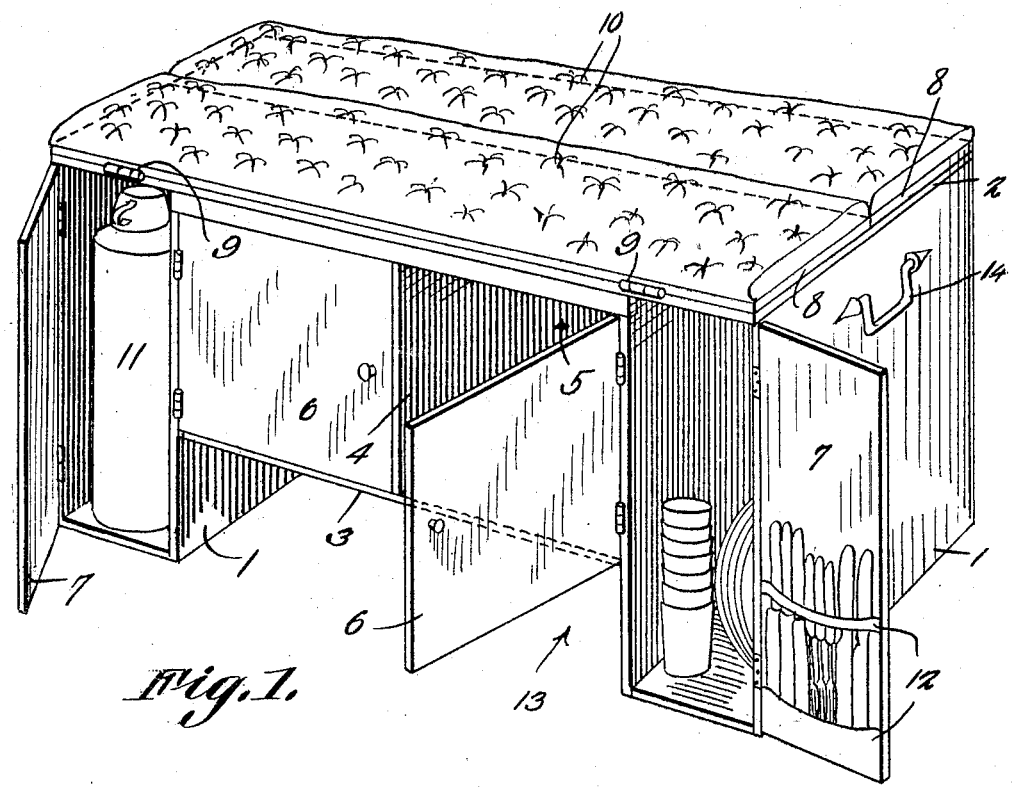
Figure 1 is a perspective view of the device.
Figure 2:
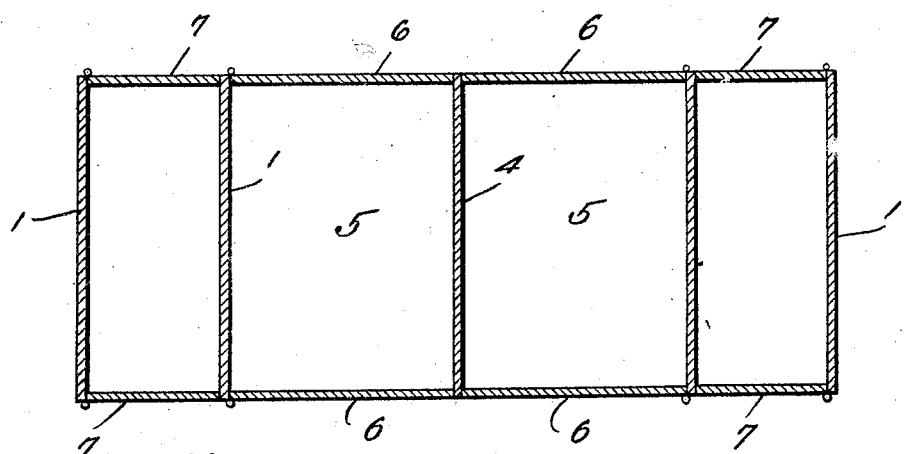
Figure 2 is a horizontal section therethrough.

1 designates end housings connected by and supporting a top 2. A horizontal partition 3 also connects the end housings and the space thereabove can be divided by a partition 4 into separate compartments 5. Both the front and back of each compartment is adapted to be closed by a hinged door 6 and doors 7 are also hingedly mounted at the front and back of each housing 1 for the purpose of closing the compartment therein. Table leaves 8 are hingedly connected at 9 to the front and rear edges of the top 2 and these leaves normally rest flat upon the top as shown in Figure 1. Cushions 10 are connected to the leaves 8 and provide a comfortable covering for the device when used as a seat. Thermos bottle 11 or the like can be stored in one of the supporting housings and plates, glasses, etc. can be carried in the other housing 1 as shown. Cutlery can be mounted in a suitable holder 12 on one of the doors 7. Food can be placed in the compartments 5 and the space 13 below the partition 3 is large enough to receive the feet of the occupants of the rear seat of an automobile when the structure is used as a supplemental seat. Handles 14 are connected to the ends of the device and by means thereof the structure can be conveyed readily from place to place.

When it is desired to use the device as a table the doors are swung outwardly at right angles to the front and back. The leaves are then swung outwardly to inverted positions. The height of the doors 6 is such that the cushions 10 will rest thereon and support the leaves in horizontal positions.

Importance is attached to the fact that the compartments of the structure all have doors at the back and front. Thus the contents of all compartments are accessible readily to persons seated at both sides of the table and can be replaced easily in the compartments after use.

What is claimed is:—

In combination, a table top, leaves hinged to said top and foldable to lie on the top, said leaves being each one half the width of the top whereby the leaves meet centrally of said top when folded thereon, hollow pedestals forming cupboards and supporting the ends of the main portion of the top, each pedestal having a door on each side of the top, said doors having their upper edges engaging closely beneath the main portion of the top and being hinged to swing outwards at right angles to said top yieldable to form supports for the ends of the leaves when unfolded, the doors holding the unfolded leaves in the same plane as the table top.

In testimony whereof I affix my signature.

SOPHIE T. SIEGEL.